United States Patent [19]
Feitler

[11] Patent Number: 6,001,763
[45] Date of Patent: Dec. 14, 1999

[54] METHOD FOR RE-MANUFACTURING A COBALT/MANGANESE/BROMINE CATALYST FROM RESIDUE CONTAINING USED CATALYST

[76] Inventor: David Feitler, 16201 Parkland Dr., Shaker Heights, Ohio 44120

[21] Appl. No.: 09/086,169

[22] Filed: May 28, 1998

Related U.S. Application Data

[63] Continuation-in-part of application No. 08/688,194, Jul. 29, 1996, Pat. No. 5,759,229.

[51] Int. Cl.$^6$ ............................... B01J 20/34; B01J 23/32
[52] U.S. Cl. .............................. 502/27; 502/22; 502/28; 502/324; 502/325
[58] Field of Search .................................. 502/22, 27, 28, 502/324, 325

[56] References Cited

U.S. PATENT DOCUMENTS

| | | | |
|---|---|---|---|
| 4,816,230 | 3/1989 | Bortnik et al. | 422/232 |
| 5,003,085 | 3/1991 | Behrend et al. | 549/232 |
| 5,382,278 | 1/1995 | O'Connell et al. | 75/626 |
| 5,402,439 | 3/1995 | Bullman et al. | 373/9 |
| 5,467,366 | 11/1995 | Wilhelmi et al. | 373/85 |
| 5,711,017 | 1/1998 | Bitler et al. | 588/200 |
| 5,759,229 | 6/1998 | Feitler | 75/352 |

*Primary Examiner*—John F. Niebling
*Assistant Examiner*—Alexander G. Ghyka
*Attorney, Agent, or Firm*—Alfred D. Lobo

[57] ABSTRACT

A process for recovering a solution of Co and Mn acetates and other valuable components of a waste residue of used catalyst discharged from a plant for the liquid-phase, homogeneously catalyzed oxidation of alkylaromatic compounds, to produce polycarboxylic aromatic acids. The residue is pyrolized in a reaction zone provided forming molten metal in an electric arc or molten metal furnace under conditions which convert essentially all carbon in the residue mainly to CO, hydrogen and compounds vaporized in an effluent from the reaction zone. The effluent is passed through a liquid-gas-contacting means to yield a quench or scrubber stream. The residue may also be sludge from a pond in which the residue is stored. The alloy recovered is atomized to form a powder metal which is then digested in acetic acid, and/or aqueous hydrogen bromide, and/or mixtures thereof with the quench or scrubber stream, to form the corresponding salts. In addition to Mn and bromine (Br) values from the effluent, these values may also be recovered from the slag, if desired. Substantially pure Co may be recovered and exported, particularly if earthy residue from a sludge pond is processed to benefit the environment.

8 Claims, 6 Drawing Sheets

METHOD FOR RE-MANUFACTURING A COBALT/MANGANESE/BROMINE CATALYST FROM RESIDUE CONTAINING USED CATALYST

CROSS-REFERENCE TO RELATED APPLICATIONS

This application is a continuation-in-part of application Ser. No. 08/688,194 filed on Jul. 29, 1996, to issue as U.S. Pat. No. 5,759,229 on Jun. 2, 1998.

FIELD OF THE INVENTION

This invention relates to a process for producing a cobalt/manganese catalyst for the oxidation of alkyl-aromatic compounds. The parent application related to the recovery of cobalt (Co), manganese (Mn) and bromine (Br) from a residue of used catalyst in a catalytic process and the reconstitution of catalyst from the recovered materials.

The Problem Addressed Herein:

Knowing that the Co, Mn and Br values in the residue of used catalyst can be recovered, how can the catalyst be reconstituted for re-use in the process from which the residue was recovered? The object is to recover the metal components and the Br value (defined below) from the residue, and reuse it.

BACKGROUND OF THE INVENTION

An alkylaromatic polycarboxylic acid, e.g. isophthalic acid (IPA), terephthalic acid (TA), trimellitic acid (TMLA), 2,6-naphthalenedicarboxylic acid (2,6-NDA), and the like is produced and recovered from the product stream of a large-scale facility for the liquid-phase, homogeneously catalyzed oxidation of the appropriate precursor alkylaromatic compounds under pressure (referred to in the art as the "Amoco® Mid-Century®" process", or "Mid-Century" process, for brevity). The catalytic reaction is carried out with air in the presence of an acetic acid/water mixture which functions as a solvent for the reactants. The process produces a stream of undesired materials as a residue which entrains components of the catalyst. This residue comprises a mixture of oxygen-containing derivatives of the reactants and reaction products including partially oxidized and dealkylated oxidized mixtures of aromatic compounds, tars, and ring-brominated aromatic compounds, much of which residue is complexed with components of the catalyst used, namely Co—Mn—Br, or, Co—Mn—Br—Ce (cerium), or, Co—Mn—Br—Zr (zirconium). The compounds include acetates, bromides and bromoacetates of Co and Mn; a wide array of aromatic and polynuclear carboxylic acids, aromatic and polynuclear aldehydes; aromatic and polynuclear mixed carboxylic acid aldehydes, including ring-brominated aromatic compounds; and, unidentified Co and/or Mn complexes and salts of the anions of acetic acid, hydrobromic acid and any of the afore-mentioned aromatic carboxylic acids.

Though the amount of this residue is relatively small, typically in the range from 0.1 to 25 weight percent of the polycarboxylic acid produced, though usually less than about 10%, the net amount of such residue produced annually in a commercial plant is so large that it is desirable to recover the metal components, specifically the Co and Mn, and the halogen component, namely Br and compounds of Br. Hereafter, for ease and convenience, the term "Br value" refers to either molecular Br, or bromine compounds such as HBr and $MnBr_2$, or the bromine content or value of the stream.

To date, this residue has been treated in the following main ways: (i) incineration to provide flyash for further processing, namely, to recover its metal content; or, (ii) discharging to a residue pond notwithstanding the loss of the value of the Co, Mn and Br content in the resulting earthy residue, or the adverse environmental impact of doing so; or, (iii) precipitating the metal values as carbonates, treating the remaining organic components and halides by dilution followed by anaerobic digestion and reconstituting catalyst by dissolving metal carbonates in acetic acid; or, (iv) calcining the residue to oxides and utilizing the oxides for other applications.

The term "residue" is used hereinbelow to refer to both plant residue as well as earthy residue, one or the other being referred to specifically when both are not included.

Referring to FIG. 1 there is schematically illustrated the main steps of a currently used commercial process for recovering catalyst from the residue. As described in U.S. Pat. Nos. 4,876,386 and 4,786,621 to Holzhauer et al, the organic matter in the residue is destroyed by incineration while the catalyst components are converted to an ash. This ash is difficult and/or expensive to convert to reusable forms of catalyst for the oxidation of methyl-substituted benzenes.

In greater detail, the residue stream is incinerated in step 2 to produce a mixed metal oxide flyash which is collected in step 3. Since not all the Co and Mn from the residue is transferred into the flyash collected, the remainder is lost in the incinerator's residue discharged to step 6. Collected flyash (from the incinerator in step 2) is washed with water in step 4 to remove the soluble salts and sodium bromide which are discarded (step 5). In the next step 7, the washed ash containing a major proportion (>50%) by weight of Co and Mn is converted to acetates and bromides of Co and Mn by digestion and extraction before being returned to catalyst inventory (step 9). Material not extracted from the washed ash is discarded (step 6). Catalyst is fed from storage (9) to the process (step 10). A portion of the catalyst from step 10 is recycled internally in step 11, being returned to storage of catalyst in step 9 for re-use in the liquid-phase oxidation reactor in step 10 or directly returned to the process, while the desired products of the reaction are separated and sent elsewhere for further processing. A purge stream from step 11 generates the residue stream 1. This residue is then incinerated to start the recovery and re-use process anew. As is evident, some portion of the metal content of the catalyst, typically from 30% to 40%, and depending upon the quality of the flyash and conditions for processing it, as much as 90% of the residue's metal content, is lost from this system, and inevitably all the Br.

In the process just described, the Co and Mn components not lost in step 3 are extracted from the flyash with aqueous acetic acid and by reducing them with hydrazine. This is done by refluxing with a 10% hydrazine solution in aqueous acetic acid. This recovery process results in the loss of a substantial portion of the Co and Mn. Despite the economic incentive (a) to recover substantially both main metals (Co and Mn) and also bromine from the residue, and (b) destroy the waste organic content of the residue, there is no suggestion in the prior art to do so, much less how to do so.

The alternative to incineration and treating flyash, namely discharging to a sludge pond, results over time, in an earthy residue which represents a large recoverable accumulation of main metals Co and Mn, and the halogen Br in the form of bromine compounds. This accumulation, though arguably a non-hazardous waste, concurrently represents a valuable resource and, if recovered, would lead to restoration of a safe environment. Discharging these wastes to a pond often leads to contamination with earthy components, such as silica, alumina, clay and the like. I know of no prior art technology which can process both organic residues, namely, this earthy residue, and the organic residue which is the source of the earthy residue.

Treatment of residues with sodium carbonate to recover the metals as carbonates, followed by dilution and anaerobic digestion is said to be inefficient, (with metal recoveries in practice being approximately 50%) and expensive, with costs approximating those of incineration. Further, halides are not recovered in this process. The anaerobic digestion of the organic compounds is also inefficient, requiring careful control of conditions to maintain an active biological culture and in the end still producing a sludge requiring disposal. Treatment of residues by calcination and using the oxide products of calcination in other applications requires a large central facility for efficient operation, fails to recover halides; and, by not returning catalyst to the manufacturer, forces the manufacturer to cope with a widely fluctuating market supply of Co and Mn, which in turn causes their prices to be highly unstable.

The process of my invention accomplishes the recovery from both residues. Destruction of organic residues and segregation of their components is effected by charging either of these streams to an appropriate pyrometallurgical treatment system, in combination with the required amount of an oxygen containing gas. By "an appropriate pyrometallurgical treatment system", I refer to a pyrometallurgical system in which the metal components are rendered into a reduced molten state. Such systems include those in which: (i) organic residue is directly introduced into a molten metal bath as described in detail in the parent application; or, (ii) an electric or plasma arc or torch, either directly or indirectly heats the organic residue, resulting in a pool of molten metal; or, (iii) an induction heating means heats the organic residue, resulting in a pool of molten metal; or, (iv) the organic residue is charged to a pool of molten salt or molten glass and the molten metal separated and collected from the bottom of the system.

Relevant prior art, teaching pyrometallurgical treatment systems which may be used for the destruction of hazardous wastes generally, is summarized as follows:

Processes for the destruction of organic waste in a bath of molten metal in the presence of oxygen, require maintaining a temperature high enough to convert the residue to oxides of carbon and to convert the metal component to a form which will dissolve in the melt. Such a melt having a viscosity no greater than 10 centipoise has been used to destroy toxic chemicals by injecting a greater than stoichiometric amount of oxygen into organic waste fed to the bath, as disclosed in U.S. Pat. No. 4,574,714. Additional references teaching molten baths for the purpose of destroying toxic chemicals are discussed in the '194 application, the disclosure of which is incorporated by reference thereto as if fully set forth herein.

The parent '194 application specifically teaches how a molten metal bath may be used to treat the residue from a Mid-Century plant and capture the Co and Mn metal values in a molten bath of essentially the same metals. Similar results may be acheived by the use of electric and plasma arc systems, of which numerous examples are known.

U.S. Pat. No. 4,431,612 to Bell et al describes the use of a high current DC electric arc, which includes a sump containing a molten bath, which can be a molten metal, and the accumulation of metallic elements from mixed chlorinated wastes (PCB's and PCB contaminated materials) charged to the system in the molten metal bath.

U.S. Pat. No. 5,534,659 to Springer et al describes the use of a plasma arc for treating organic and inorganic wastes and isolating molten metal and slag therefrom, and adding steam to the system to ensure the conversion of all carbon containing components to carbon monoxide and carbon dioxide.

In *Proceedings of the International Symposium on Environmental Technologies: Plasma systems and Applications*, Oct. 8–11, 1995, Atlanta, Ga., pp 251, Retech, Inc. describes an apparatus for the treatment of wastes using a plasma torch in a centrifugal chamber, with the discharge of molten metal through a center hole, and subsequent use of atomization to render the metal in powder form.

U.S. Pat. No. 3,744,779 to Perry describes the recovery of metal values in scrap materials by heating sufficiently to destructively distill organic compounds and recover melted metal in the absence of oxygen.

U.S. Pat. No. 3,770,419 to Brown describes a pyrolysis system which produces molten metal from refuse containing metal.

U.S. Pat. No. 4,230,043 to Deardorff describes a system of destroying polybrominated biphenyls by exposure at 3000° F. to iron by-product from steel making, a mineral acid and a pulverized reducing metal.

U.S. Pat. No. 5,085,738 to Harris describes the destruction of organic wastes by thermal conversion in a pool of molten lead in the absence of oxygen.

U.S. Pat. No. 3,890,908 to von Klenck et al describes pyrolytic destruction of waste by passage through a bath of molten metal or glass in the absence of air.

U.S. Pat. No. 4,246,255 to Grantham et al describes the disposal of PCBs by feed PCB's and a source of oxygen into a molten salt bath.

The field of pyrolytic destruction of wastes is one of active research and this list is intended merely to represent key variations in the technologies which might be applied as a pyrometallurgical step. None of the foregoing teaches or suggests why or how a powder of an alloy of Co, Mn and C would provide an effective medium for the reconstitution of a catalyst comprising a mixture of Co and Mn acetates.

Providing a feed stream of the organic residue under appropriate process conditions to one of the aforementioned pyrometallurgical processes, will result in two product streams and a slag: (i) a gas phase comprising carbon monoxide, hydrogen and bromine values; (ii) molten metal containing cobalt, manganese and carbon; and, depending on the composition of the feed, the slag composition consisting essentially of metal oxides other than those of Co and Mn, although a substantial amount of Mn may be directed to the slag, as specifically described in the parent '194 application. Granted that the molten metal generated is in the form of a Co/Mn or Co/Mn/C alloy, there is no motivation to generate a powder, then pursue digestion of the powder in acetic acid, or, a quench tower or scrubber recycle stream (hereafter "quench stream") obtained by absorbing evolved gases in aqueous acetic acid, or mixtures of acetic acid and the quench stream, unless one's goal is to re-manufacture the Mid-Century catalyst. Even so, the prior art does not teach how such digestion may be satisfactorily accomplished.

The preparation of catalyst feed solutions for the Mid-Century process is currently performed by any of several methods. Co and Mn metals are separately digested in glacial acetic acid, or concentrated aqueous acetic acid, and added to the reactor separately to allow precise control of the ratio of the Co and Mn acetates. Alternatively, cobalt or manganese acetate can be prepared by digestion of the respective metal hydroxides. These hydroxides are often prepared by digesting the metal in a strong acid such as nitric acid, precipitating by treatment with caustic, washing, and collecting the insoluble hydroxide (see U.S. Pat. No. 1,637, 281 to Schatz).

Preparation of cobalt acetate directly from metal is problematic, requiring the use of large excess of metal. The prior art favors the use of promoters such as bromide salts of compatible metals or elevated pressures and the use of oxygen to obtain effective digestion. When Co is in the form of powder, introduction of oxygen into the vessel to obtain a practical rate of digestion in 50% acetic acid, still allows only 86% of the cobalt to be digested after 2 hr. To get substantially complete conversion it is necessary to add an activator (see U.S. Pat. No. 3,133,942 to Hahl, Examples 4 et seq). One would therefore not expect that cobalt would be substantially completely digested in the absence of added oxygen. In order to process cobalt in the form of electrolytic chip (pieces about ⅛" by 1¼"), U.S. Pat. No. 4,921,986 to Fox teaches the use of elevated pressures to increase the oxygen concentration in solution.

The alloy obtained in the pyrometallurgical system of this invention has as its main components: cobalt, manganese and carbon, the amount of carbon remaining depending upon treatment of molten alloy. In an effective process for reconstituting a Co/Mn/C catalyst in a reasonable period of time, less than 24 hrs, it is critical that substantially complete digestion of the metals in this alloy be obtained. By "substantially complete digestion" I refer to the digestion of at least 90% of the Co/Mn metals. Partial digestion, unless proportional, is unsuited for the reconstitution of this catalyst because changing the Co/Mn ratio from that received in the waste, would require readjusting the ratio. The problem of disposing of, or otherwise treating or re-processing the undigested material would remain. The prior art does not teach the digestion of a Co/Mn/C alloy in acetic acid. There is no suggestion in the prior art that an alloy of Co/Mn/C be deliberately converted to a powder for the purpose of digestion in non-alcoholic glacial acetic acid, non-alcoholic solutions of acetic acid, or a mixture of non-alcoholic acetic acid and the quench stream; and, no suggestion that the powder be in a size range smaller than 5000 $\mu$m, preferably in the range from about 5 $\mu$m to 1000 $\mu$m, most preferably in the range from 45 $\mu$m to 500 $\mu$m, so that it will lend itself to substantially complete digestion of the metals in the aforesaid digesting liquids even at ambient pressure, making superatmospheric digestion in the aforesaid solutions unnecessary.

It is well-known that Mn powder is readily digested in hot acetic acid; and powdered Co is partially digested in 80% acetic acid (20% water) but leaves a heel even at reflux at ambient pressure. Typically, the alloy herein contains carbon present in an amount smaller than either the Co or Mn but greater than 0.5%. The amount of carbon held in the alloy is limited by the saturation limit. This limit may be as much as 7% based on the total weight of the alloy, and depends on the composition of the alloy (see *CR Acatt Sc. Paris*, vol 264 pg 281–284, Jan. 16, 1967). One would expect the difficulty of digesting an alloy with the carbon to be increased greatly, since it is well known that as little as 0.03% carbon in stainless steel helps resist intergranular corrosion (see *Corrosion Resistance Tables*, by Schweitzer, Philip A., pg vii, Marcel Dekker Inc.). It is accepted that corrosion is digestion occurring at a slow rate. Further, knowing that it is not possible to predict the rate of corrosion of an alloy from data relating to the rates of corrosion of the alloy's individual components, one cannot predict how easily an alloy of Co and Mn will be substantially completely digested in the aforesaid digesting liquids, if the alloy is digested at all. Whatever the rate of corrosion of the alloy of Co/Mn, the presence of carbon in the alloy would simply complicate the task of predicting the rate.

G. Arrivaut (*Proces-Verbaux*, 1905 pp 107–114), describes the prepartion and digestion of several Co/Mn alloys. The alloys containing from 60–85% Mn digest completely in ammonium chloride, hydrochloric acid, sulfuric acid, nitric acid and hydrofluoric acid. In alcoholic solutions of acetic acid, only partial digestion occurs, and the unreacted metal is greatly enriched in cobalt. Arrivaut does not teach the digestion of Co/Mn alloy in acetic acid solutions other than the dilute alcohol system. Arrivaut also notes that the residual material is a pyrophoric powder. (see *Comprehensive Treatise on Inorganic & Theoretical Chemistry*, by Mellor, J. W. Vol. XIV, pg 544, Longmans, Green & Co., New York).

With particular respect to the quench stream obtained by absorbing evolved gases from the reaction zone of the Mid-Century process in which the catalyst is used, the absorbent stream may be aqueous acetic acid, or a mixture of acetic acid and HBr, and/or $MnBr_2$, and such other products of reaction which are absorbed during recirculation of the stream through the absorption zone. Since the composition of the stream varies in both acetic acid and HBr, as well as other components, it's effect on the alloy in powder form, is not predictable.

The process of this invention is uniquely well suited to recover essentially all of the Co, Mn and Br values in both of these residue streams. By "essentially all" is meant that in excess of 90%, typically in excess of 95%, and preferably in excess of 99% of the components may be recovered. The process is operated to re-manufacture a catalyst at the same ratio as the incoming residue. By "incoming residue" is meant a single stream from a given Mid-Century plant, or the combination of multiple streams from plants producing the same or different product, or streams of earthy residues, or streams of earthy residues and plant residue streams.

A further advantage of this invention is that much equipment already existing in a facility for the recovery of Co and Mn values from flyash may be used to remanufacture catalyst from the recovered Co/Mn/C alloy thus decreasing costs.

SUMMARY OF THE INVENTION

It has been discovered that the Co and Mn components of an organic waste residue of used catalyst from a facility for the oxidation of an alkyl-aromatic compound, may be recovered by feeding the waste into a pyrometallurgical reaction zone to produce an alloy of Mn/Co/C, with the ratio of Mn/Co being in the range from about 5:1 to 1:5, and carbon being present in an amount in the range from 0 to 7% by weight of the alloy; concurrently liberating off-gases with bromine values; forming a metal powder of the alloy having a primary particle size smaller than 5000 $\mu$m; and substantially completely digesting the powder with a non-alcoholic digesting liquid to produce a salt solution of the Co and Mn acetates. The digesting liquid is glacial acetic acid, or, aqueous acetic acid, or, a mixture of acetic acid and a quench stream obtained by absorbing evolved gases from the reaction zone.

It has also been discovered that a combination of the aforementioned gas phase and molten metal obtained from the pyrometallurgical process, provides feed streams from which a solution of the metal acetates may be recovered for re-use in the Mid-Century process.

It is a general object of this invention to provide a means by which the waste residue is converted to a Co/Mn/C alloy in the form of a powder resulting from atomising an alloy obtained in the pyrometallurgical processing of a residue of used catalyst from a Mid-Century process, without leaving a residue containing a substantial amount of metal; and this is accomplished without the use of a solubilizing agent such as oxygen gas, reducing agent, activator, promoter or accelerator.

It is a specific object to provide a process for recovering essentially all the Br values in the residue.

It is also a specific object to prepare a powder of Co/Mn/C by supercooling the molten alloy in a stream of fluid under sufficient pressure and velocity to reduce the molten alloy to particles smaller than 5000 μm, then digesting the Co and Mn in the powder substantially completely in acetic acid to form a solution of cobalt and manganese acetates in acetic acid; alternatively, to digest the powder substantially completely in the quench stream, or mixtures of acetic acid, water and the quench stream; when carbon is in the alloy, a finely divided carbon residue is obtained.

It is also a specific object to provide a process with unique symbiosis, facilitating the economical recovery of valuable metals from earthy residue dredged from sludge ponds, thereby restoring the environment. Bromine is also recovered from the earthy residue (if on hand) which may be processed while plant residue is being processed. Since the Co, Mn and Br compounds recovered from added earthy residue will be in excess over that required to replenish depleted catalyst from a process generating plant residue, the excess Co, Mn and Br compounds may be used for other purposes.

It is another specific object to provide a process which digests a powder of Co/Mn/C alloy in acetic acid, or the quench stream, or mixtures thereof, substantially completely in a single step.

It is another specific object to provide a process which combines the quench stream comprising solutions of $MnBr_2$ and HBr recovered from the off-gases, with a solution of Co and Mn salts obtained by digestion of the powder, to yield a solution of Co and Mn salts useful as a catalyst in the Mid-Century process.

It is also a general object of this invention to provide a system for preparing a Co/Mn catalyst solution from an alloy of Co and Mn metals, typically with from 0.2% to 5% by weight of carbon, derived from the aforesaid organic residue, comprising, pyrometallurgical means having a thermochemical reaction zone into which said residue is received; feed means for feeding said residue into said pyrometallurgical means; means for controlling operating parameters, including pressure and temperature in the range from about 1100° C. to about 2500° C. in said thermochemical reaction zone, effective to convert essentially all carbonaceous matter into carbon monoxide and carbon dioxide, and the remainder of said residue into an alloy of Co/Mn/C wherein said Co is present in an amount in the range from about 10 parts to about 80 parts per 100 parts by weight of alloy, and the carbon is less than 7 parts; liquid-gas contacting means for removing gaseous effluent and a portion of said alloy from said reaction zone; means for comminuting said alloy into a powder in the a size range smaller than 5000 μm; and, means for digesting Co and Mn from said powder substantially completely in acetic acid, hydrobromic acid, and mixtures thereof.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Detailed Description of the Figures

Figure 1:
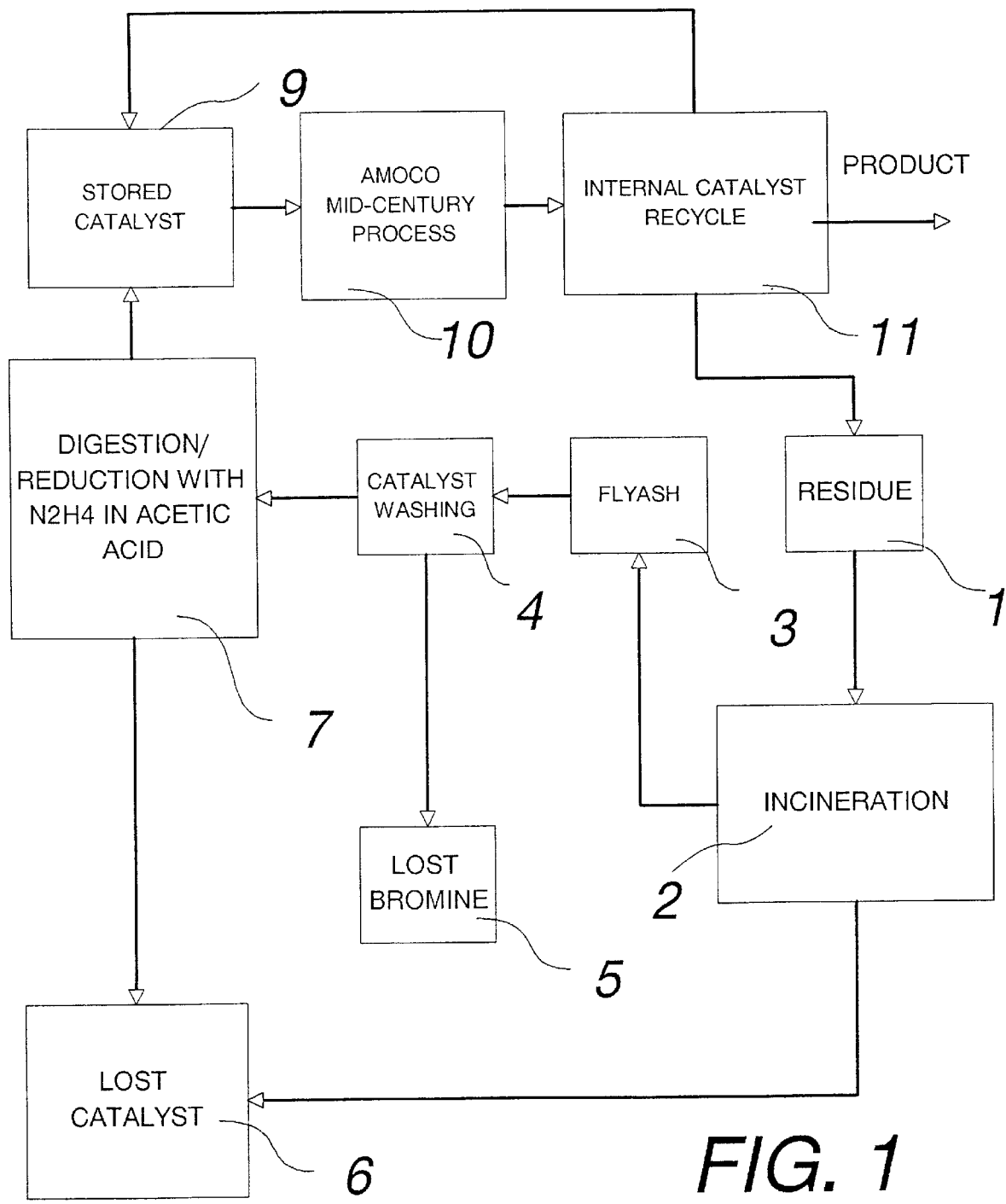
FIG. 1 is a flowsheet schematically illustrating the steps in a currently used commercial process for the recovery of Co and Mn values from flyash collected by incinerating residue obtained from the Mid-Century process.
Figure 2:
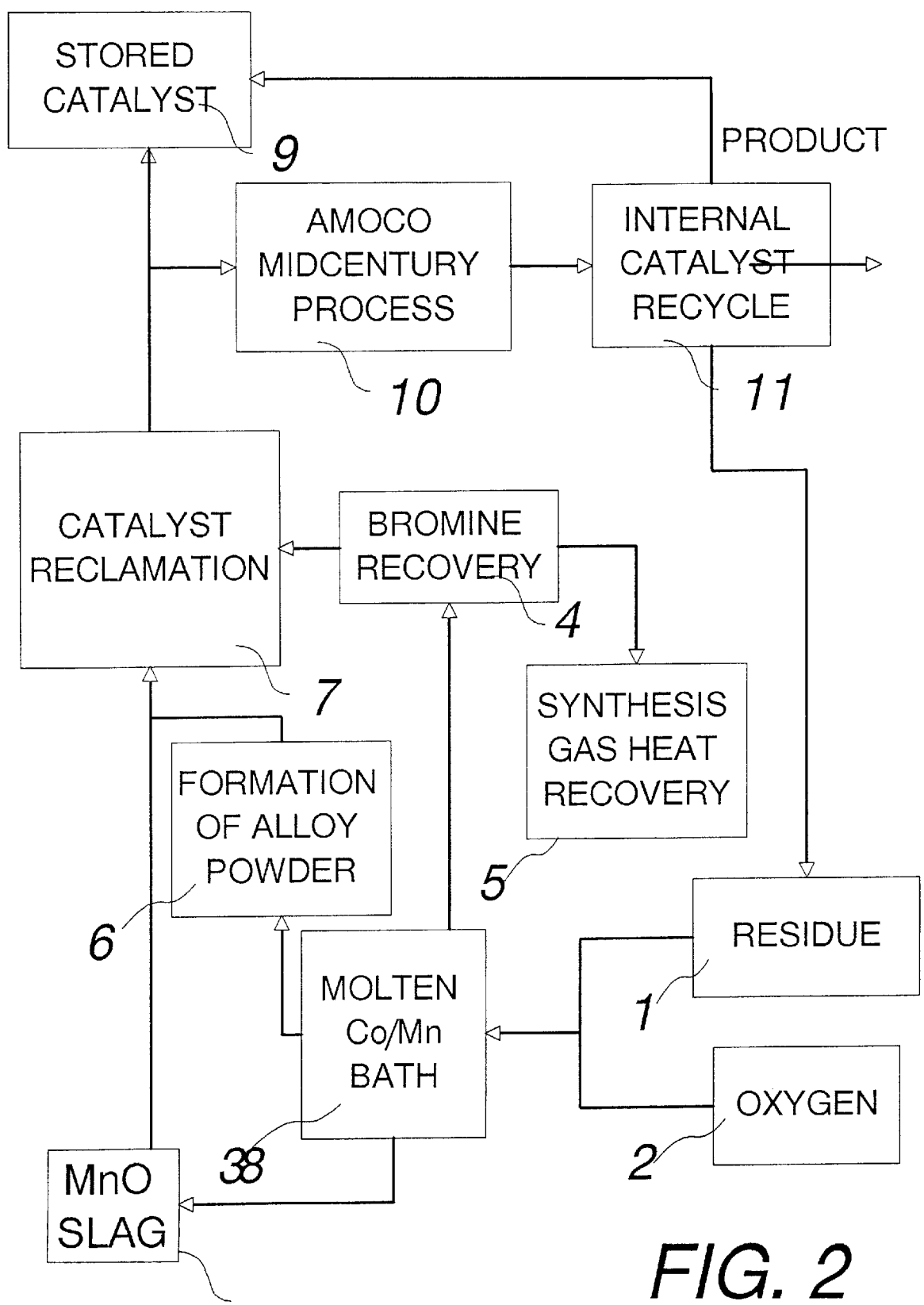
FIG. 2 is a flowsheet schematically illustrating the steps in the process claimed herein for the recovery of Co, Mn and Br substantially quantitatively from the residue obtained in the same Mid-Century process, and reformulating, recombining and reconstituting the effluent streams to regenerate the Co/Mn/Br catalyst. This same flowsheet also illustrates the steps in the process claimed herein to handle multiple plant waste streams, and to produce a desired ratio of Co/Mn in the melt, or even pure cobalt.

In greater detail, FIG. 2 schematically illustrates the main steps of a preferred embodiment of the novel process in which residue is collected and de-watered in step 1, then fed, along with a molecular oxygen-containing gas, preferably oxygen, from a source of oxygen 2, or water in the form of steam, to a thermochemical reaction zone in which a reactor contains molten Co/Mn alloy (step 3). Residue is added to the melt and converted in the presence of the oxygen, to molten alloy and a slag layer which floats on the surface of the melt (step 8). Vapors leaving the reactor as effluent gas include CO, $H_2$, and bromine-containing matter, mainly HBr and $MnBr_2$. The bromine containing components are collected in a scrubber or other liquid-gas-contacting device in step 4. Effluent from the scrubber consists essentially of CO and $H_2$ which are ducted away to step 5 where they are used for their fuel value, or for some other economically desirable purpose.

Molten alloy is withdrawn from the bath 3 and atomized to form a powder of the alloy which is collected as a fine alloy powder in step 6. The alloy powder is then reacted with aqueous acetic acid, or hydrobromic acid, separately or combined, or optionally combined with the products of bromine value recovery (step 4). The desired composition of re-manufactured Co/Mn catalyst may also be adjusted by addition of MnO from the slag, or Mn(OAc)$_2$ or MnBr$_2$ solution prepared from the MnO slag in step 8. Re-manufactured catalyst is stored in step 9, preferably after filtering to remove insoluble materials including particles of unreacted alloy or carbon, and after conventional treatment to remove corrosion metals. Stored catalyst is fed, as required, to the reactor in the Mid-Century process in step 10 to synthesize the desired reaction product. The product is then obtained by conventional means, returning a portion of the catalyst to the process with an internal recycle in step 11, and purging a portion to a residue stream. A portion of the internally recycled catalyst may be returned to storage in step 9, and the residue is discharged to step 1 where the process is started anew. The process details and equipment used in the loop formed by steps 9, 10 and 11 which result in the discharge of the residue in step 11 and from distillation of the desired carboxylic acid, are all well known and set forth in one or more patents relating to the Mid-Century process. Some are U.S. Pat. Nos. 4,162,991; 4,266,084; 4,311,521; 4,794,195; 4,876,385; 4,876,386; 5,081,290; and 5,181,290; and, the specific disclosures thereof relating to the process operating conditions which generate recoverable residue, are incorporated by reference thereto as if fully set forth herein. Details of processes and equipment used in the removal of corrosion metals are also well known and set forth in one or more patents relating to the Mid-Century process.

Figure 3:
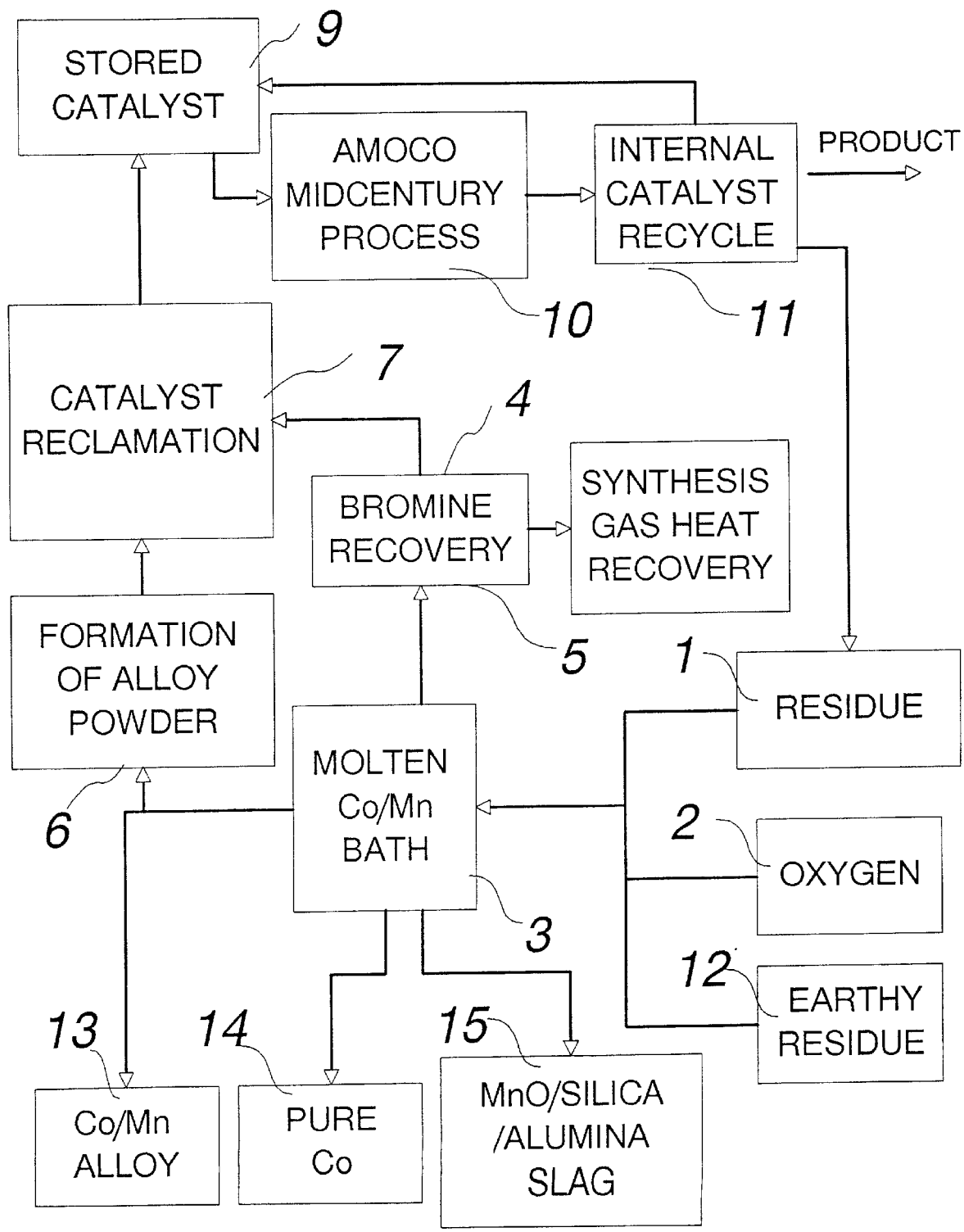
FIG. 3 is a flowsheet schematically illustrating the steps in the process illustrated in FIG. 2, when the process depicted therein is carried out in conjunction with converting earthy residue. A portion of the Co, Mn and Br produced is exported because it is in excess of that required for re-manufacture of the depleted catalyst.

Referring to FIG. 3 there is schematically illustrated the processing of earthy residue in conjunction with plant residue. In addition to the process steps 1 through 8 described above in FIG. 2, earthy residue is processed along with plant residue as follows: Earthy residue is dredged from a sludge pond, dried in driers at 12, and the dried earthy residue fed to the reactor at 3 with oxygen from 2. Optionally, earthy residue may be combined with plant residue before drying both in step 1.

Accordingly, dried earthy residue from step 12 is fed to the reaction zone in step 3 and Br compounds recovered by scrubbing with any desired absorbent in step 4. As before, the CO and H$_2$ may be recovered for use in step 5. The build-up of alloy is prevented by withdrawing melt from the bath in step 13. As before, essentially pure Co may be withdrawn at 14 if an essentially pure cobalt melt is used in the reactor and excess oxygen is added to convert all Mn in the residue which is not driven off as MnBr$_2$ vapor, to MnO which is withdrawn as slag. Components such as silica, alumina and magnesium oxide are also withdrawn as slag.

As before, Br is recovered in step 4 and excess Br values removed for other uses. If no more catalyst for storage is required, then excess Co/Mn alloy is withdrawn in step 13 for export, either as ingots of alloy or as powder alloy. If essentially pure Co is to be recovered in 14, then excess oxygen over actual stoichiometric is fed to an essentially pure Co melt in the reactor, thus removing Mn from the melt as MnO. The MnO is rejected to the slag which is removed at 15.

Figure 4:
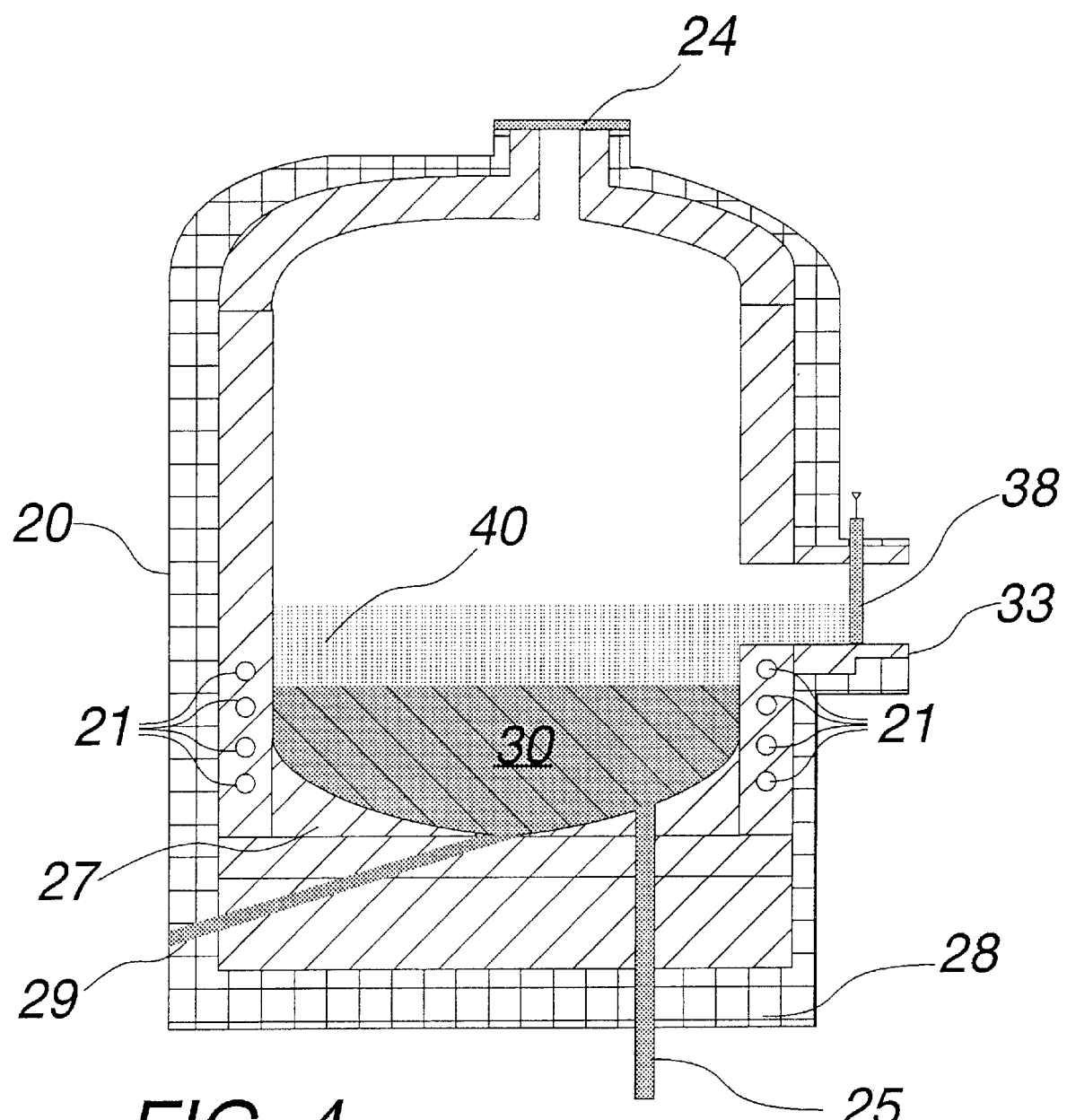
FIG. 4 diagrammatically illustrates a reactor of known design and construction to provide a bath of substantially pure molten Co.

Residue is also conventionally obtained in step 1 after the reaction product from step 10 is distilled. This residue, along with residue obtained from the internal catalyst recycle in step 11, is fed in step 3, into the molten alloy bath in a reactor schematically illustrated in FIG. 4, and referred to generally by reference numeral 20. The reactor 20 is a cylindrical induction furnace having a steel body 23 with induction coils 21 built into 75% alumina refractory-lined walls 22 of the reactor which is provided with a water-cooled gated slag discharge spout 33 equipped with a tightly fitting gate 38 which is opened periodically to discharge slag 40. Preferably, mullite fiber insulation is packed between the outer surface of the refractory walls 22 and the inner surface of the steel body 23 of the reactor. Molten alloy 30 is held in the lower portion of the reactor; the level of the melt is preferably maintained below the slag discharge spout 33. The lower portion of the reactor preferably rests on a 95% magnesite ramming mix 27 which is packed between the lower steel outer surface of the reactor and a supporting structure of chromic oxide-alumina bonded 90% super-duty firebrick 28.

Hot gases from the reactor are led through an effluent discharge nozzle 24 through a pressure lock to a water scrubber (not shown). To feed the reactor 20, residue is led into it through the tuyere 25 through which residue mixed with oxygen is introduced into melt 30. If desired, oxygen may also be injected into the molten alloy bath through a separate conduit. An over-accumulation of molten alloy is prevented by withdrawing a portion through the molten alloy taphole 29.

Characterization of Plant and Earthy Residues, and Pretreatment thereof:

Residue may contain in the range from about 0.01% to about 45% by weight (wt) of Co and Mn combined, on a water-free basis, typically from about 2% to 10% by wt, and includes small quantities of other metals, particularly Ce and Zr, each typically present in an amount less than 1% by wt of dry residue, and other metals added deliberately as either catalyst promoters or unavoidably present as corrosion products. By "dry residue" is meant that the moisture content is less than 1% by wt. Mn typically predominates in the residue, the weight ratio of Mn/Co being as much as 5:1, though in some instances Co predominates, the Co/Mn ratio being in the range from 1:1 to about 5:1; typically the Mn/Co ratio is 1:2 to 5:1.

Plant residue contains a mixture of components. For illustrative purposes, a composition of residue drawn from the patent literature is shown in Table 1. It is understood that the specific residues will vary with the feeds and process conditions and the process of this invention is in no way limited by this particular example of residue composition.

TABLE 1

Residue of terephthalic acid manufacture on acetic acid and water free basis

| Component | Wt % |
|---|---|
| Phthalic Acids | 19.7 |
| Benzoic Acid | 14.8 |
| Toluic Acids | 26.8 |
| Methyl Phthalic Acids | 2.6 |
| Trimellitic and Trimesic Acids | 4.3 |
| 4-Carboxybenzaldehyde | 9.1 |
| Tolualdehyde | 0.4 |
| Benzaldehyde | 0.004 |
| Terphthaldehyde | 0.2 |
| Methylbenzyl acetate | 0.02 |
| Formyl Acetate | 0.1 |
| Benzyl Benzoate | 0.07 |
| Phthalide | 2 |
| Co-Products | 4.2 |
| Cobalt Acetate | 4.5 |
| Manganese Acetate | 8 |
| Bromine | 2.2 |
| Iron | 0.09 |
| Sodium | 0.3 |
| Trace Metals | 0.02 |

Preferentially this residue is dried to remove water prior to injection into the molten Co/Mn or Co bath. The preference for a dried feed is entirely economic, in that there is a cost penalty attached to heating water.

Sludges will vary widely in composition depending on the age of the plant, the time resident in the pond and any treatments added to the pond water or process effluent stream. The sludge will also contain biomass of varying composition and in general fewer of the organic components described in Table 1. In addition, clays, binders, flocculants and settling agents may also be present, these being determined by local conditions. Unlike many processes, recovery of Co and Mn in this invention is largely insensitive to the additional contaminants introduced by clays, binders and floculants. Typical impurities introduced are $SiO_2$, $Al_2O_3$, MgO, and Fe in the forms they may be present in clays, binders and floculants. $SiO_2$, $Al_2O_3$, and MgO will all partition to the slag phase under the conditions of this reaction.

Although not critical to this invention, it is preferable that the sludge be dried before addition to molten bath. Drying may take place separately from the plant residue stream, or the streams may be consolidated and dried.

The Nature of the Melt and Operating Conditions

To operate the process, the reactor is charged with any convenient form of Co and Mn metals in proportions to produce a Co/Mn alloy having approximately the same ratio of Co:Mn as is expected to be formed when the melt reaches equilibrium with a feed of residue from the Mid-Century process. The initial heating of the charge is effected by the induction coils. Alternatively, a hot charge may be generated by any other suitable means such as in an electric arc furnace from which molten alloy is transferred to the reactor.

Once the charge is melted and reaches a temperature above the melting point of the Co/Mn alloy to be formed, oxygenated residue is injected into the melt. The temperature of the melt is allowed to increase until the desired temperature of the melt in the operating range from about 1150° C. to about 2500° C., is reached. No additional carbonaceous matter is required to be added to the residue to satisfy the chemical needs of the thermochemical reaction.

The heat energy in the molten alloy incites disproportionation of the organic moieties in the residue, converting them to CO and $H_2$ while the Br is liberated mainly as HBr and $MnBr_2$ gases.

The thermochemical reaction may be either exothermic, endothermic, or neutral, depending upon the amount and composition of the carbonaceous matter in the residue, when a typical water-free residue is fed to the reactor, and the amount of oxygen. If endothermic, additional heat required to maintain the temperature of the bath may be supplied by electricity in the induction coils, or by introducing a fuel directly in the bath for the sole purpose of maintaining its temperature. Such fuel may be provided with natural gas, propane or any other sources of heat energy from other plant vent or waste streams (such as brominated organic compounds derived from vent streams) which are less expensive than electricity, and are unrelated to and independent of the chemical conversion of residue into Co, Mn and Br.

Once the reactor is in operation, a wide range of ratios of Mn/Co may be fed in the residue without sacrificing the ability to tailor the ratio of Mn/Co in the molten bath. If the bath is found to have a higher Mn content than is desired, excess oxygen is used to remove as much Mn as is necessary. On the other hand, while normally there is no reason to increase the Mn content of the bath relative to the Co present, it may be done by adding MnO or Mn metal to the residue.

It is critical that the melt in which the residue is to be converted be Co or a Co/Mn alloy particularly where an alloy is to be recovered. The ratio of Co:Mn in the melt is not critical. Typically, both Co and Mn are replenished in the bath when residue is fed to the bath in the presence of oxygen, and whatever amounts of carbon monoxide, hydrogen, hydrogen bromide, and metal bromides which are generated in the vapor phase. A Co/Mn alloy containing essentially no bromine compounds, is recovered for reuse. The alloy most typically formed is from residue in which the ratio of Mn/Co is in the range from about 1:1 to about 3:1.

To recover Co and Mn in an alloy in which the ratio of Co/Mn is the same ratio as that in the residue fed to the molten bath, it is not only essential that an actual stoichiometric amount of oxygen be used, but also that MnBr2 be recovered from the effluent. If desired, substantially pure cobalt may be recovered as described below.

Since the carbonaceous content of plant residue is converted mainly to carbon monoxide and hydrogen and the residue contains less than 1% by wt of metals other than Co and Mn, accumulation of slag is slow except when conditions are deliberately chosen to reject all or part of the Mn in the residue into the slag layer. Accumulation of slag is expected when earthy residue is used.

The reactor may be operated under either atmospheric, subatmospheric or superatmospheric pressure, typically in the range from more than 1, up to about 20 bar (atmospheres), preferably in the range from 1 to 10 bar, the reactor being designed and constructed to operate under the conditions chosen.

The reaction is run under conditions whereby the reactants are exposed to process conditions for a sufficient length of time as to ensure complete reaction. I define a numerical criterion for such time as the rate at which cobalt is added divided by the total mass of the metal phase of melt. This measure is similar to the standard definition of Weight Hourly Space Velocity and is hereafter referred to as WHSV. Suitable ranges of operating conditions are between $0.1\ hr^{-1}$ and $1\times10^{-5}\ hr^{-1}$, preferably between $10^{-2}\ hr^{-1}$ and $10^{-4}\ hr^{-1}$. The upper limit of residence time will be that required to recover the lowest concentration of Co in a residue having the highest concentration of carbonaceous matter which is to be destroyed.

Stoichiometry

Temperature and oxygen feed rates may be used to control the chemical constitution of the system. If, as is generally desired, low carbon levels in the melt are to be obtained, higher temperatures are clearly preferred, as are higher oxygen feed rates. If all the manganese fed is to be retained in either the melt or as vapor phase $MnBr_2$ then some carbon must be allowed to build up in the metal alloy phase. If all manganese is to be removed from the molten phase, then the reaction must be driven with sufficient oxygen to achieve 95+% purity. Since all desired materials can be recovered no matter what combination of the three phases they are distributed in, the choice of operating conditions and subsequent product distribution becomes a matter of local economic preference and convenience.

The stoichiometry of oxygen addition must take into account the above considerations and balance other needs as well. The stoichiometric level of oxygen is the amount of oxygen that is required to convert all carbon present to carbon monoxide without conversion to carbon dioxide, or converting metals to metal oxides, or hydrogen to water. The amount of oxygen added to meet this stoichiometry must take into consideration oxygen or oxygen equivalents in the incoming feed. The amount of divalent metals entering the system except those which leave the system in the vapor phase as bromide compounds count as oxygen equivalents.

The organic residues of the Mid-Century process typically contain large amount of oxygen, having carbon to oxygen ratios of 7/2 or higher. Earthy residues will have carbon and oxygen content too.

If it is desired to alter the ratio of Co/Mn in the feeds to remove part or all of the manganese, oxygen levels must be raised sufficiently to react with the desired amount of MnO.

Finally, if additional fuel is used to maintain temperature in an endothermic system, then its carbon and oxygen content is counted with in the stoichiometry as well.

This can be expressed in the following equation:

$$\text{Moles } O_2 \text{ gas to be added} = \{C_{tot} - O_{tot} + Mn_{ox} - Co^{+2} - Mn^{+2}\}/2$$

wherein, $C_{tot}$ is the total moles of carbon fed including any carbon in added fuel, $O_{tot}$ is the total atom equivalents of oxygen in the feed, $Mn_{ox}$ is the Moles of Mn to be rejected as oxide, $Co^{+2}$ is divalent cobalt in the feed, and, $Mn^{+2}$ is divalent cobalt in the feed to be retained in the bath and not rejected as either MnO or $MnBr_2$ in the vapor phase.

Reactor Design and Construction

Design of suitable reactors to perform this reaction are disclosed in U.S. Pat. Nos. 5,191,154; 5,301,620; 5,358,697; 5,396,850; 5,433,572; 5,435,982; 5,436,210, and 5,491,279 and references cited therein and hereby incorporated by reference thereto as if fully set forth herein, although this invention is not limited by teachings in those specific designs. The design of a reactor to accommodate this reaction scheme is not part of the subject matter of this invention.

Figure 5:
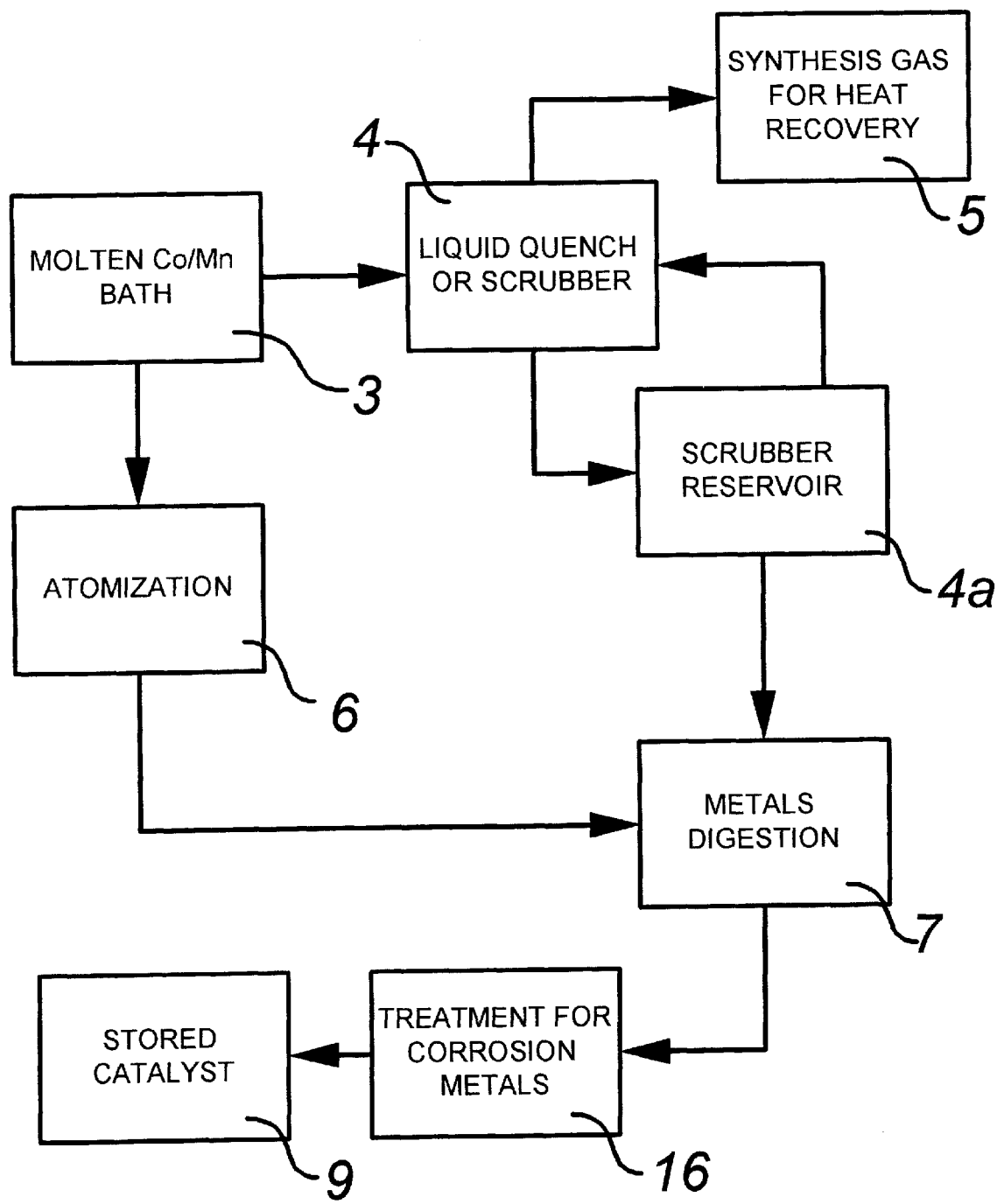
FIG. 5 is a flowsheet schematically illustrating the steps in the process illustrated in FIG. 2, detailing unit operations for the reclamation of desired catalyst.

Referring to FIG. 5 there is shown a flowsheet schematically illustrating the steps and processing units to digest powder alloy, and to recover values from gases evolved after those values are absorbed in a liquid quench or scrubber stream. Molten Co/Mn alloy from a reservoir 3 of a furnace such as a molten metal or electric arc furnace, is periodically discharged and led to an atomiser 6 in which the melt is quenched with a high velocity stream of fluid, typically water at ambient temperature under pressure in the range from 1 to about 20 bar, producing a powder. Effluent from the furnace is led to a liquid quenching tower or scrubber 4 into which aqueous acetic, aqueous HBr acid, and preferably recycled scrubber stream from scrubber reservoir 4a is introduced. The scrubber stream is typically a mixture of aqueous acetic acid, HBr acid, $MnBr_2$, NaBr and such other products of reaction as are absorbed during recirculation of the stream through the reaction zone. The scrubbed gases may be conventionally demisted and polished to remove traces of acid materials before recovering the heat values in 5. The scrubber liquid is periodically or continuously purged from scrubber reservoir 4a and makeup liquid continuously or periodically added as required. Bromine values from 4a may be conventionally recovered and returned to the Mid Century process directly, or incorporated in the metal acetate stream before or after digestion of metals.

Gaseous effluent from the scrubber 4, including mainly CO and $H_2$ may be conventionally demisted and polished to remove traces of acid materials before storing in 5 to recover their heat values, or as synthesis gas. A scrubber stream from 4a is led into a corrosion resistant digester 7 into which powder metal from atomiser 6 is fed. The digester 7, is typically a glass fiber-reinforced resin, glass-lined, or stainless steel tank which is vented to allow the safe release of hydrogen gas, and fitted with a means of supplying heat, such as steam coils. The metals are digested in a mixture of acetic acid and water chosen to meet the requirements of further processing and catalyst utilization. Recycle scrubber liquors from 4a may be used as all or part of the digestion liquids depending upon the desired composition of the catalyst with respect to bromine components. The digestion is preferably carried out at about atmospheric pressure at a temperature in the range from Ad about 120° C. to 150° C., either continuously or batch-wise until substantially all Co and Mn is in solution as salts. If batch-wise the digestion is typically complete in less than 72 hr. If Mn is to be recovered from oxides of Mn in slag, the slag is also digested in the digesting liquid.

A stream of salt solution is withdrawn from digester 7, and conventionally filtered to remove suspended carbon particles; it is then treated in vessel 16 with conventional procedures to remove unwanted metals introduced by corrosion of equipment, usually iron, chromium and nickel, but others may be present. Typically the treatment removes these corrosion metals from solution as precipitates which are filtered off. The resulting Co/Mn salt solution may be adjusted in concentration by evaporation, addition of small amounts of conventionally prepared cobalt and/or manganese acetates, mixed with solution from the scrubber reservoir 4a, or by any combination of the preceding before storing in 9 for reuse in a Mid Century process.

Figure 6:
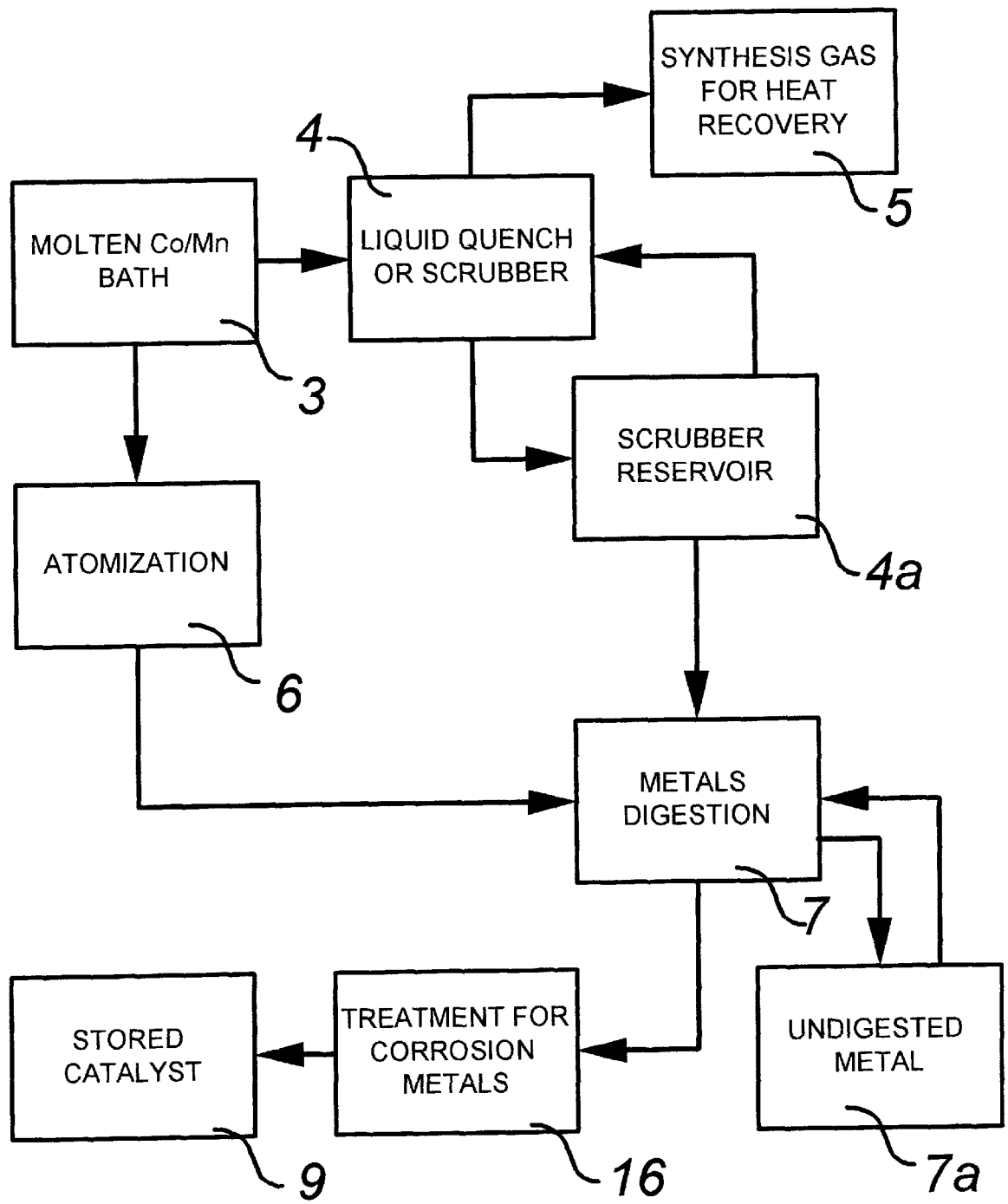
FIG. 6 is a flowsheet analogous to one shown in FIG. 5, except that provision is made for processing a residue when metal digestion proceeds in a proportionate fashion, that is the ratio of Co to Mn in solution is the same as that found in the alloy allowing a heel of metal to be maintained and reused.

Referring to FIG. 6, there is shown an embodiment analogous to that described in FIG. 5 above, except that the rate of digestion of the Co and Mn components is controlled so as to provide the desired ratio of salts in the salt solution removed from the digester 7. Under such circumstances, unreacted metal may be either left in the reactor, or, removed from the reactor and stored in storage vessel 7a, for digestion in a latter batch.

Integration

This process offers numerous opportunities for integration into plant operations, both supplying and consuming waste heat through heat exchange, and offering $CO/H_2$ as either fuel for heat recovery or as a feed for chemical reactions. This invention may be conventionally integrated into the general operation of a plant for oxidation of an alkylaromatic, and means for integration therein forms no part of this invention.

Recovery and Application of Materials from the Molten Bath

Catalyst is re-manufactured by first atomizing the molten metal to produce a powder metal then reacting the powder metal with aqueous acetic acid or aqueous acetic acid/hydrobromic acid mixtures or acidic streams containing manganese bromide or any combinations thereof at temperatures in the range from 80° to 150° C. to produce the metal acetates. HBr may be added in the amount desired.

Numerous methods for production of powders of metals are taught in "Atomization of Melts" by Andrew J. Yule and John J. Dunkley published by Oxford Science Publications, Oxford, England. The powder metal is preferably produced with a metal powder generating system marketed by Atomising Systems Limited, Sheffield, England. An alternative is to recover the alloy in the form of ingots of Co/Mn alloy or pure cobalt, particularly if earthy residue is being processed for export, or as solid particulate free metal, obtained directly from the melt.

Recovery and Application of Materials from the Slag Phase

Any method for periodically or continuously removing slag may be used, depending upon the amount of slag being generated. The slag may be atomized, cast, or otherwise reduced handled to produce a solid form suitable for chemical use or disposal.

If a slag comprises a major proportionby weight of MnO, it may be economical to recover the Mn value from the slag.

This may be accomplished by any conventional acidic or basic leaching process. In those cases where Mn value is to be returned to the catalytic process, aqueous acetic acid and/or aqueous hydrobromic acid are the preferred leachants.

Recovery of Mn and Br Values from the Vapor Phase

The Br and Mn values transported in the vapor phase are preferably recovered by any conventional unit operations for removing materials from the vapor phase. Such unit operations include condensation, desublimation, quenching and scrubbing the effluent gas with water, or, concentrated or dilute acetic acid, or aqueous hydrobromic acid. A scrubber will typically be operated in a recirculating mode resulting in a scrubbing solution approaching equilibrium concentrations of $MnBr_2$ and HBr. These operations may be carried out under atmospheric or superatmospheric conditions up to 20 bar, and elevated temperature up to 250° C., such as are optimum for such processes.

The thermal energy (BTU content) of the effluent gases after the bromine content is removed may be recovered by employing a conventional gas-fed boiler. The energy content may also be converted directly to electricity by a device such as a fuel cell.

Catalyst Reconstitution

The primary source of material to reconstitute catalyst is the molten metal withdrawn from the bath. It is preferred to reduce the size of solid metal particles by a size reduction technique such as atomization in order to facilitate the digestion to metal salt at reduced temperatures and pressures by virtue of a higher surface area. In general recombination of at least one of the two other stream.s collects, slag and vapor phase scrubbing solution will be required to reconstitute catalyst. While the active catalyst is generally considered mixture of Co/Mn and HBr or bromide salts, in some cases bromine content of the aromatic oxidation reaction is managed separately. In these cases the bromine compound containing scrubber stream may be recycled separately from the reconstitution of a catalyst which is solely Co and Mn acetates.

Excess Recovery

Since Co, Mn and Br values derived from the earthy residue msy be in excess of that required for catalyst to be immediately re-used, such excess may be used to re-manufacture catalyst for storage. Thus, it will now be evident that processing of plant residue my proceed as usual, and earthy residue may be processed as the need for products for export from the plant, arises or may be processed to clean up the sludge pond site.

Where earthy residue is to be processed unrelated to the re-manufacture of catalyst for the plant, it is necessary to practice only the essential steps to recover the economically valuable components of the earthy residue.

ILLUSTRATIVE EXAMPLES

For the residues treated in the following illustrative examples, the average molecular composition corresponds approximately to benzoic acid ($C_7H_6O_2$). The residue herein consists essentially of acetates of Co and Mn, and HBr, the remaining organics being expressed as benzoic acid. Designations of "moles" refers to kilogram-moles (KgMoles). The percent by weight of Br and Co in the residue fed to the reactor, is maintained the same in each of the examples below, as is the reactor pressure of 10 atm. In each case, the recovered melt of metal is atomized and converted to re-manufactured catalyst.

Example 1

Ratio of Co/Mn=1/1 in residue fed; ratio of Co/Mn=1/1 in re-manufactured catalyst; Mn in the re-manufactured catalyst is recovered from the alloy melt, the MnBr from the scrubber and the MnO from the slag.

A bath of Co/Mn/MnO/C (609/325/37/29) containing 1000 Kg of molten metal and slag is maintained at the given equilibrium composition at 2200° C. under 10 atm pressure in the reactor. Essentially all the MnO is present in the slag which forms an immiscible layer above the Co/Mn alloy. 292 Kg/hr of dry plant residue containing 2% Co, 2% Mn and 4% Br by wt, is injected into the molten alloy with oxygen. The WHSV based on Co is 0.0658 hr-1. The equivalent rates of feed (moles/hr) are as follows: C=14.83; O=4.82 (contained in the residue); Co=0.099; and Mn=0.054 (remaining Mn introduced with the residue is in the slag as MnO, or, leaves in the reactor's effluent as $MnBr_2$). The amount of oxygen injected is about 157.9 Kg/hr (4.93 KgMoles) and effluent from the reactor is led to a water scrubber. During operation at equilibrium, about 70.4 Kg of molten alloy are withdrawn every 8 hr, and atomized to yield a powder having an average particle diameter of 100 $\mu$m, using a high pressure water stream. The composition of the particles is essentially the same as that of the melt beneath the slag.

During the same 8 hour period, 1040 L (liters) of scrubber water are collected containing 76.2 Kg of $MnBr_2$ and 36.6 Kg of HBr. MnO accumulates in the slag at a rate of about 0.35 Kg/hr. Slag levels are adjusted by periodic withdrawals, and the slag withdrawn is atomized to 100 $\mu$m with a stream of water under high pressure.

The 70.4 Kg of atomized metal, 1040 L of scrubber water and 119 Kg of glacial HOAc (acetic acid) are combined in a vented heated vessel, and the temperature raised to 90° C., resulting in a solution of mixed acetates and bromides of Co and Mn in which solution Co and Mn are 4.1% and 3.8% by wt, respectively. There is essentially no free acid. In an analogous manner, the atomized slag is digested with HOAc at 90° C. to yield a solution of $Mn(OAc)_2$. The desired Mn level in the re-manufactured catalyst is adjusted to Co/Mn= 1/1 by addition of the required amount of this $Mn(OAc)_2$. The re-manufactured catalyst is filtered to remove suspended carbon in the alloy.

Example 2

Ratio of Co/Mn=1/2 in residue fed; ratio of Co/Mn=1/1 in re-manufactured catalyst; Mn not wanted in the melt is rejected as MnO in slag by using enough oxygen to form the MnO.

A bath of Co/Mn/MnO/C (341/194/463/1.4) containing 1000 Kg of molten metal and slag is maintained at the given equilibrium composition at 2200° C. under 10 atm pressure in the reactor. Essentially all the MnO is present in the slag which forms an immiscible layer above the Co/Mn alloy. 292 Kg/hr of dry plant residue containing 2% Co, 4% Mn and 4% Br by wt, is injected into the molten alloy with oxygen. The WHSV based on Co is 0.01075 $hr^{-1}$. The equivalent rates of feed (moles/hr) are as follows: C=14.2; O=4.95; Co=0.099; and Mn=0.06 (remaining Mn is in the slag, or, leaves the reactor in the effluent). The amount of oxygen injected is about 150.3 Kg/hr (4.7 KgMoles) and effluent from the reactor is led to a water scrubber. During operation at equilibrium, about 73.1 Kg of molten alloy are withdrawn every 8 hr, and atomized to form a powder metal as in Example 1 above. The composition of the particles is essentially the same as that of the melt beneath the slag.

During the same 8 hour period, 1040 L of scrubber water are collected containing 69.3 Kg of $MnBr_2$ and 41.2 Kg of HBr. MnO accumulates in the slag at a rate of about 7.9 Kg/hr. Slag levels are adjusted by periodic withdrawals, and the slag withdrawn is atomized to 100 $\mu$m with a stream of water under high pressure.

The 73.1 Kg of atomized metal, 1040 L of scrubber water and 122 Kg of glacial HOAc are combined in a vented heated vessel, and the temperature raised to 90° C., resulting in a solution of mixed acetates and bromides of Co and Mn in which solution Co and Mn are 4.1% and 3.9% by wt, respectively. There is essentially no free acid. As in Example 1 above, if necessary, slag is digested with HOAc to yield a solution of $Mn(OAc)_2$ and as much of this solution as necessary is added to provide the desired 1/1 ratio of Co/Mn in the re-manufactured catalyst. Also as before, re-manufactured catalyst is filtered to remove suspended carbon in the alloy.

Example 3

Recovery of substantially pure Co; ratio of Co/Mn=1/2 in residue fed. Essentially all Mn is rejected to slag by using enough oxygen.

A bath of Co/Mn/MnO/C (548/11/424/17) containing 1000 Kg of molten metal and slag is maintained at the given equilibrium composition at 1500° C. under 10 atm pressure in the reactor. Essentially all the MnO is rejected to slag which forms an immiscible layer above the molten metal. 292 Kg/hr of dry plant residue containing 2% Co, 2% Mn and 4% Br by wt, is injected into the molten alloy with oxygen. The WHSV based on Co is 0.01028 $hr^{-1}$. The equivalent rates of feed (moles/hr) are as follows: C=14.83; O=4.82; Co=0.099; and Mn=0.0022 (remaining Mn is in the slag or leaves in the effluent). The amount of oxygen injected is about 163.8 Kg/hr (5.12 KgMoles) and effluent from the reactor is led to a water scrubber. During operation at equilibrium, about 47.6 Kg of essentially pure Co (95+%) are withdrawn every 8 hr. The molten metal may be cast as ingots for export from the plant, or the molten metal may be atomized as in Example 1 above to yield a powder. The composition of the metal particles is essentially the same as that of the melt beneath the slag.

During the same 8 hour period, 1040 L of scrubber water are collected containing 68.4 Kg of $MnBr_2$ and 41.5 Kg of HBr. MnO accumulates in the slag at a rate of about 4.5 Kg/hr. Slag levels are adjusted by periodic withdrawals, and the slag withdrawn is atomized to 100 $\mu$m (avg. part. diam.) as in Example 1 above, for recovery of its Mn content, if desired.

Example 4

Ratio of Co/Mn=1/1 in residue fed; ratio of Co/Mn=1/1 in re-manufactured catalyst; Mn in the re-manufactured catalyst is recovered from the alloy melt and the $MnBr_2$ from the scrubber (no MnO from the slag is converted). The effect of changing temperature and the amount of oxygen fed, is illustrated.

A bath of Co/Mn/MnO/C (662/325/8.9/2.8) containing 1000 Kg of molten metal and slag is maintained at the given equilibrium composition at 2000° C. under 10 atm pressure in the reactor. Essentially all the MnO is rejected to slag which forms an immiscible layer above the molten metal. 292 Kg/hr of dry plant residue containing 2% Co, 2% Mn and 4% Br by wt. is injected into the molten alloy with oxygen. The WHSV based on Co is 5.886×$10^{-3}$ $hr^{-1}$. The equivalent rates of feed (moles/hr) are as follows: C=14.83; O=4.82; Co=0.099; and Mn=0.054 (remaining Mn is in the slag or leaves in the effluent). The amount of oxygen injected is about 160.8 Kg/hr (5.03 KgMoles) and effluent from the reactor is led to a water scrubber. During operation at equilibrium, about 69.6 Kg of molten alloy are withdrawn every 8 hr, and atomized to form a powder metal as in Example 1 above. The composition of the metal powder is essentially the same as that of the melt beneath the slag.

During the same 8 hour period, 1040 L of scrubber water are collected containing 90.3 Kg of $MnBr_2$ and 24.2 Kg of HBr. MnO accumulates in the slag at a rate of about 0.08 Kg/hr. Slag levels are adjusted by periodic withdrawals, and the slag withdrawn and atomized as in Example 1 above.

The 69.6 Kg of powder metal, the scrubber water and 127 Kg of glacial HOAc are combined as in Example 1, to produce a solution of mixed acetates and bromides of Co and Mn in which solution Co and Mn are 4.1% and 4.0% by wt, respectively. There is essentially no free acid. As in Example 1 above, if necessary, slag is digested with HOAc to yield a solution of $Mn(OAc)_2$ and as much of this solution as necessary is added to provide the desired 1/1 ratio of Co/Mn in the re-manufactured catalyst. Also as before, re-manufactured catalyst is filtered to remove suspended carbon in the alloy.

Example 5

Ratio of Co/Mn=1/1 in residue fed; conditions for producing essentially pure cobalt (99+% pure) by rejecting essentially all Mn from molten metal.

A bath of Co/Mn/MnO/C (485/4.5/509.3/7) containing 1000 Kg of molten metal and slag is maintained at the given equilibrium composition at 1700° C. under 10 atm pressure in the reactor. Essentially all the MnO is rejected to slag which forms an immiscible layer above the molten metal. 292 Kg/hr of dry plant residue containing 2% Co, 2% Mn and 4% Br by wt, is injected into the molten alloy with oxygen. The WHSV based on Co is 0.0119 $hr^{-1}$. The equivalent rates of feed (moles/hr) are as follows: C=14.83; O=4.82; Co=0.099; and Mn=0.0001 (remaining Mn is in the slag or leaves in the effluent). The amount of oxygen injected is about 190.4 Kg/hr (5.95 KgMoles) and effluent from the reactor is led to a water scrubber. During operation at equilibrium, about 47.1 Kg of essentially pure Co (99+%) are withdrawn every 8 hr. The molten metal may be cast as ingots for export from the plant, or the molten metal may be atomized as in Example 1 above to yield a powder. The composition of the metal particles is essentially the same as that of the melt beneath the slag.

During the same 8 hour period, 1040 L of scrubber water are collected containing 65.9 Kg of $MnBr_2$ and 66 Kg of HBr. These may be stored for the re-manufacture of catalyst in the future, or exported for any other use. MnO accumulates in the slag at a rate of about 6 Kg/hr. Slag levels are adjusted by periodic withdrawals, and the slag withdrawn is atomized to 100 $\mu$m (avg. part. diam.) as in Example 1 above, for recovery of its Mn content, if desired.

Example 6

Ratio of Co/Mn=1/3 in residue fed; melt recovered is used to re-manufacture catalyst with Co/Mn=3/1.

A bath of Co/Mn/MnO/C (285/694/0/21) containing 1000 Kg of molten metal and slag is maintained at the given equilibrium composition at 2000° C. under 10 atm pressure in the reactor. 292 Kg/hr of dry plant residue containing 2% Co, 6% Mn and 4% Br by wt, is injected into the molten alloy with oxygen. The WHSV based on Co is 5.83×$10^{-3}$ $hr^{-1}$. The equivalent rates of feed (moles/hr) are as follows: C=13.6; O=5.07; Co=0.099; and Mn=0.26 (remaining Mn is in the slag or leaves in the effluent). The amount of oxygen injected is about 131.1 Kg/hr (4.10 KgMoles) and effluent from the reactor is led to a water scrubber. During operation at equilibrium, about 160 Kg of molten alloy are withdrawn every 8 hr, and atomized to form a powder metal as in Example 1 above. The composition of the metal powder is essentially the same as that of the melt beneath the slag.

During the same 8 hour period, 1040 L of scrubber water are collected containing 98.3 Kg of $MnBr_2$ and 18.6 Kg of HBr. No MnO accumulates in the slag. Slag levels are adjusted by periodic withdrawals.

The 160 Kg of atomized metal, 1040 L of scrubber water and 329 Kg of glacial HOAc are combined as in Example 1, to produce a solution of mixed acetates and bromides of Co and Mn in which solution Co and Mn are 3.6% and 10.6% by wt, respectively. There is essentially no, free acid. Also as before, re-manufactured catalyst is filtered to remove suspended carbon in the alloy.

Example 7

Ratio of Co/Mn=1/3 in residue fed; effect of a 1% increase in gaseous oxygen fed in Example 6; result—increases MnO formed in slag and reduces carbon in the alloy; re-manufacture of catalyst with Co/Mn=1/3.

The bath maintained at the same equilibrium composition and under the same temperature and pressure conditions as in Example 6, is fed with the same amount of dry plant residue (292 Kg/hr) to provide a WHSV based on Co of $5.96 \times 10^{-3}$ hr$^{-1}$. The equivalent rates of feed (moles/hr) are as follows: C=13.6; O=5.07; Co=0.099; and Mn=0.25 (remaining Mn is in the slag or leaves in the effluent). The amount of oxygen injected is about 132.8 Kg/hr (4.15 KgMoles) and .effluent from the reactor is led to a water scrubber. During equilibrium operation, the bath composition is Co/Mn/MnO/C (288/683/22/6 by wt). About 157 Kg of molten alloy are withdrawn every 8 hr, and atomized to form a powder metal as in Example 1 above. The composition of the metal powder is essentially the same as that of the melt beneath the slag.

During the same 8 hour period, 1040 L of scrubber water are collected containing 99 Kg of MnBr$_2$ and 18.1 Kg of HBr. MnO accumulates in the slag at 0.45 Kg/hr. Slag levels are adjusted by periodic withdrawals.

The 157 Kg of atomized metal, the 1040 L of scrubber water and 323 Kg of glacial HOAc are combined as in Example 1, to produce a solution of mixed acetates and bromides of Co and Mn in which solution Co and Mn are 3.6% and 10.5% by wt, respectively. There is essentially no free acid. As in Example 1 above, if necessary, slag is digested with HOAc to yield a solution of Mn(OAc)$_2$ and as much of this solution as necessary is added to provide the desired 1/3 ratio of Co/Mn in the re-manufactured catalyst. Also as before, re-manufactured catalyst is filtered to remove suspended carbon in the alloy.

Example 8

Residue fed is a mixture of plant residue and earthy residue from a particular sludge pond in which there was no liner in the bottom of the pond.

A bath of Co/Mn/MnO/C (409/244/337/8.8) containing 1000 Kg of molten metal and slag is maintained at the given equilibrium composition at 1900° C. under 10 atm pressure in the reactor. Essentially all the MnO is present in the slag which forms an immiscible layer above the Co/Mn alloy. A mixture of 292 Kg/hr of dry plant residue containing 2% Co, 2% Mn and 4% Br by wt, and 38.9 Kg/hr of dry earthy residue containing 15% Co, 30% Mn, 26.2% O, 8.3% Al, 8.7% Si, and 10.3% C, by wt, is injected into the molten alloy with oxygen. The WHSV based on Co is 0.017 hr$^{-1}$. The equivalent rates of feed (moles/hr) are as follows: C=15.16; O=5.46; Co=0.2; and Mn=0.13 (remaining Mn is in the slag, or, leaves the reactor in the effluent). The amount of oxygen injected is about 154.7 Kg/hr (4.83 KgMoles) and effluent from the reactor is led to a water scrubber. During operation at equilibrium, about 149 Kg of molten alloy are withdrawn every 8 hr, and atomized to form a powder metal as in Example 1 above. The composition of the particles is essentially the same as that of the melt beneath the slag.

During the same 8 hour period, 1040 L of scrubber water are collected containing 95 Kg of MnBr$_2$ and 21.3 Kg of HBr. MnO accumulates in the slag at a rate of about 9.63 Kg/hr. Slag levels are adjusted by periodic withdrawals at 8 hr intervals, and the slag withdrawn is atomized to 100 μm (avg. part. diam.) with a stream of water under high pressure.

The 149 Kg of atomized metal, the 1040 scrubber water and 323 Kg of glacial HOAc are combined in a vented heated vessel, and the temperature raised to 90° C., resulting in a solution of mixed acetates and bromides of Co and Mn in which solution Co and Mn are 7.3% and 6.3% by wt, respectively. There is essentially no free acid. As in Example 1 above, if necessary, slag is digested with HOAc to yield a solution of Mn(OAc)$_2$ and as much of this solution as necessary is added to provide a desired ratio of Co/Mn in the re-manufactured catalyst. Also as before, re-manufactured catalyst is filtered to remove suspended carbon in the alloy.

Example 9

Digestion of mixture of powders of essentially pure Co and Mn metals as control:

Finely divided powders of Co and Mn in the size range from to +325 mesh (45 μm) to −100 mesh (150 μm), U.S. Standard Test Series, were obtained from Alfa-Aesar Co. The Co powder was black, the Mn powder silvery. 1.57 g of the Co and 3.13 g of the Mn were together placed in a 250 ml round-bottomed flask equipped with a heating mantel and a water cooled reflux condenser, and mixed. Glacial acetic acid (133.3 g) was added to the flask. Vigorous evolution of gas was observed before the addition of water. The rate of gas formation increased when water (27.7 g) was added. The solution remained clear, pale brown during this period. Heating was initiated and gas evolution increased and then diminished. No visible amount of silver powder remained in the flask, indicating that essentially all the Mn was digested.

As the system approached reflux gas evolution began again and a purple color formed indicating that Co was starting to react. After 22.5 hours heating was halted, and the sample filtered and washed. Unreacted cobalt (a magnetic, black powder, 0.27 g) was recovered. The solution was analyzed as before and contained 0.71% Co and 1.67% Mn. The inability to digest the Co powder in acetic acid substantially completely after a reasonable period, even under reflux conditions, is evidence that such incomplete digestion may also be expected when the Co is in an alloy of Co/Mn.

Example 10

A Co/Mn/C alloy was prepared by melting Co metal, Mn metal together with carbon dust in a graphite-lined induction furnace under an inert (hydrogen) atmosphere blanket. The melt was allowed to equilibrate and then atomized by contacting with a high pressure water spray in the presence of argon. The resultant powder was sieved into two fractions with a U.S. Standard No. 80 Test Sieve, one larger than 180 μm, the other smaller (i.e. −80 mesh). The powder is representative of one obtained from the output a thermochemical reaction zone, whether a molten metal bath, electric arc furnace, or other pyrometallurgical means having a thermochemical reaction zone into which de-watered residue of used catalyst is received. The material analysis indicated 47.5% Co; 51.3% Mn and 0.9% Carbon.

4.95 g of −80 mesh alloy powder was placed in a 250 ml round-bottomed flask equipped with a heating mantel and a water cooled reflux condenser. Glacial acetic acid (129.6 g) and water (22.2 g) were added to the flask and heating initiated without pressurizing the flask. The liquid rapidly developed a pink color and the solution was purple by the time reflux was reached. Analysis of a diluted sample of purple liquid taken after 6 hours of digestion indicated 0.045% cobalt and 0.054% manganese. After 75 hours heating was halted, and the sample filtered and washed with water and isopropanol. A small amount (0.25 g) of a non-magnetic, non-pyrophoric black powder was recovered as a solid residue.

After digestion was halted, the liquid in the flask was analyzed for the concentration of metal salts. Analysis indicated 0.85% Co, and 0.93% Mn. The solid residue in the bottom of the flask was found to contain 57.7% Co, 37.4% Mn, with carbon and the weight of oxygen in metal oxides deemed to make up the balance.

Experiment 11

5.2 g of −80 mesh alloy powder was placed in a 250 ml round-bottomed flask equipped with a heating mantel and a water cooled reflux condenser. Glacial acetic acid (133.3 g) and water (27.7 g) were added to the flask and heating initiated. As in Example 10 above, the liquid rapidly developed a pink color and the solution was purple when it started to reflux. After 19 hours heating was halted, and the sample filtered and washed with water and isopropanol. A small amount (0.55 g) of a non-magnetic, non-pyrophoric black powder was recovered as a solid residue.

In a manner analogous to that described in Example 9 above, after digestion was halted, the liquid in the flask was analyzed for the concentration of metal salts. Analysis indicated 0.84% Co, and 0.92% Mn. The solid residue in the bottom of the flask was found to contain 54.4% Co, and 41.0% Mn, with carbon, and the weight of oxgyen in metal oxides deemed to make up the balance.

I claim:

1. A process for producing a manganese/cobalt catalyst from an organic residue of used catalyst from a facility for the oxidation of an alkyl-aromatic compound, said process comprising,
   (a) feeding a waste catalyst residue into a pyrometallurgical reaction zone to produce an alloy of manganese, cobalt and carbon, with the ratio of Mn/Co being in the range from about 5:1 to 1:5, and carbon being present in an amount in the range from 0 to 7% by weight of the alloy;
   (b) liberating off-gases including CO, $H_2$ and bromine values;
   (c) forming a metal powder of said alloy having a primary particle size smaller than 5000 μm; and,
   (d) contacting said metal powder with a non-alcoholic digesting liquid selected from the group consisting of glacial acetic acid, aqueous acetic acid, and a mixture of acetic acid and a quench or scrubber stream obtained by absorbing evolved off-gases from said reaction zone at a temperature in the range from about 80° to 150° C. at about atmospheric pressure; whereby said powder is substantially completely converted into a solution of acetates of said Co and Mn.

2. The process of claim 1 wherein said residue is selected from the group consisting of plant residue and earthy residue.

3. The process of claim 1 wherein said alloy includes carbon present in an amount smaller than either the Co or Mn, and in the range from 0.2% to 5% by weight of said alloy.

4. The process of claim 1 wherein said powder has a primary particle size in the range from 5 μm to about 1000 μm.

5. The process of claim 1 wherein concentration of said acetates of Co and Mn in said solution is adjusted to match a desired ratio for use as catalyst.

6. The process of claim 1 including absorbing said off-gases in an absorbent in an absorption zone, said absorbent selected from the group consisting of water, aqueous acetic acid, and a recycle stream mixture from said absorption zone, said recycle stream consisting essentially of a mixture of acetic acid and an acidic solution of bromine compounds.

7. The process of claim 1 wherein said Mn and Co in said solution of acetates is in a ratio which is essentially the same as the ratio of Mn and Co in catalyst from which said residue is derived.

8. The process of claim 3 wherein said Mn/Co ratio is in the range from about 4:1 to 1:2, and said carbon is present in an amount in the range from 0.5% to 7% by weight of said alloy.

* * * * *